(12) United States Patent
Langford et al.

(10) Patent No.: US 12,041,917 B2
(45) Date of Patent: Jul. 23, 2024

(54) AQUARIUM FILTER ARRANGEMENT INCLUDING PRE-FILTER MEMBER AND METHODS

(71) Applicant: Spectrum Brands, Inc., Middleton, WI (US)

(72) Inventors: Catherine Langford, Blacksburg, VA (US); William Nathan Brunner, Jr., St. Peters, MO (US); John Shumate, Shawsville, VA (US); William D. Himes, Radford, VA (US)

(73) Assignee: Spectrum Brands, Inc., Middleton, WI (US)

( * ) Notice: Subject to any disclaimer, the term of this patent is extended or adjusted under 35 U.S.C. 154(b) by 441 days.

(21) Appl. No.: 17/436,524

(22) PCT Filed: Mar. 2, 2020

(86) PCT No.: PCT/US2020/020666
§ 371 (c)(1),
(2) Date: Sep. 3, 2021

(87) PCT Pub. No.: WO2020/180796
PCT Pub. Date: Sep. 10, 2020

(65) Prior Publication Data
US 2022/0174919 A1    Jun. 9, 2022

Related U.S. Application Data

(60) Provisional application No. 62/813,455, filed on Mar. 4, 2019.

(51) Int. Cl.
*A01K 63/04* (2006.01)
*B01D 24/12* (2006.01)
*B01D 29/23* (2006.01)
*B01D 29/56* (2006.01)
*C02F 1/00* (2023.01)
(Continued)

(52) U.S. Cl.
CPC ............ *A01K 63/045* (2013.01); *B01D 24/12* (2013.01); *B01D 29/232* (2013.01); *B01D 29/56* (2013.01); *C02F 1/001* (2013.01); *C02F 3/082* (2013.01); *C02F 2103/20* (2013.01)

(58) Field of Classification Search
CPC .... A01K 63/045; B01D 24/12; B01D 29/232; B01D 29/56; C02F 1/001; C02F 2103/20; C02F 3/082
See application file for complete search history.

(56) References Cited

U.S. PATENT DOCUMENTS 4,622,148 A * 11/1986 Willinger ............. A01K 63/045
                                                    210/615
5,160,622 A    11/1992 Gunderson et al.
(Continued)

OTHER PUBLICATIONS

International Search Report and Written Opinion for PCT/US2020/020666, mailed Jun. 3, 2020.

*Primary Examiner* — Terry K Cecil
(74) *Attorney, Agent, or Firm* — Merchant & Gould P.C.

(57) ABSTRACT

An aquarium filter assembly includes a transfer tube to convey aquarium liquid and a pre-filter member secured to an end of the transfer tube. The pre-filter member may include a rigid porous media basket, or it may include a micron filter of pleated media.

13 Claims, 10 Drawing Sheets

(51) Int. Cl.
*C02F 3/08* (2023.01)
*C02F 103/20* (2006.01)

(56) References Cited

U.S. PATENT DOCUMENTS

| | | | | |
|---|---|---|---|---|
| 5,176,824 A | * | 1/1993 | Willinger | A01K 63/045 |
| | | | | 119/260 |
| 5,288,400 A | | 2/1994 | Phillips | |
| 6,106,709 A | | 8/2000 | Bresolin | |
| 6,202,597 B1 | * | 3/2001 | Hsiung | A01K 63/045 |
| | | | | 210/85 |
| 10,638,732 B2 | * | 5/2020 | Brunner | A01K 63/045 |
| 2005/0252842 A1 | | 11/2005 | Hoffmeier | |

* cited by examiner

AQUARIUM FILTER ARRANGEMENT INCLUDING PRE-FILTER MEMBER AND METHODS

This application is as a PCT International patent application No. PCT/US2020/020666, filed Mar. 2, 2020, which claims priority to U.S. Provisional Patent Application No. 62/813,455, filed Mar. 4, 2019, which applications are incorporated herein by reference. To the extent appropriate, a claim of priority is made to each of the above disclosed applications.

TECHNICAL FIELD

This disclosure relates generally to devices for use in aquarium filters. In particular, this disclosure relates to a filter arrangement for use in filtering aquarium water.

BACKGROUND

To maintain an ecological balance within an aquarium, it is necessary to clean the aquarium water. Cleaning is often accomplished by filtering the aquarium water through a filter housing. In the filter housing, water enters a filter chamber, flows through a filter element, and is then returned to the aquarium.

Continued improvements in filtering of aquarium water are desirable.

SUMMARY

A filter arrangement is provided which improves the prior art.

In one aspect, an aquarium filter assembly is provided including a transfer tube to convey aquarium liquid having a distal end; and a pre-filter member secured to the distal end of the transfer tube.

The pre-filter member may include a media basket.

The media basket can include a rigid porous surrounding wall defining an interior volume, with the filter media being within the interior volume.

In some embodiments, the rigid porous surrounding wall has a circular cross section.

Filter media held by the porous basket may comprise carbon media.

Filter media held by the porous basket may include one or a combination of; foam, bio-balls, ceramic media, ammonia neutralizing crystals, or medications.

In some embodiments, the pre-filter member comprises a micron filter.

The micron filter can include a cylindrical construction of pleated media.

The filter assembly can further comprise a pump having a liquid flow inlet and liquid flow outlet. The transfer tube is in the flow communication with the liquid flow outlet of the pump.

In some arrangements, there is an intake tube upstream of and in flow communication with the liquid flow inlet of the pump.

In some embodiments, there is also a mechanical filter cartridge downstream of the pre-filter member.

One or more embodiments can include a biological filter downstream of the mechanical filter cartridge.

In some embodiments, there is further comprising a housing with an interior containing the transfer tube and the pre-filter member.

In another aspect, a filter arrangement for an aquarium is provided. The filter arrangement includes a pump having a liquid flow inlet and liquid flow outlet. An intake tube is upstream of and in flow communication with the liquid flow inlet of the pump. A housing is in flow communication with the liquid flow outlet of the pump. A transfer tube within the housing and downstream of and in flow communication with the liquid flow outlet of the pump. The transfer tube has a pump end adjacent to the pump and an opposite distal end. A pre-filter member is within the housing containing filter media secured to the distal end of the transfer tube. A mechanical filtering chamber is within the housing having a removable and replaceable filter cartridge therein and downstream of the pre-filter member. A bio-filtering chamber is within the housing and has a biological filter downstream of the mechanical filtering chamber.

In some embodiments, the pre-filter member comprises a porous media basket including a rigid porous surrounding wall defining an interior volume, in which filter media is within the interior volume.

In some embodiments, the rigid porous surrounding wall has a circular cross section.

In some embodiments, the rigid porous surrounding wall has a rectangular cross section.

The filter media held by the porous basket may comprise carbon media.

The filter media held by the porous basket can include one or a combination of: foam, bio-balls, ceramic media, ammonia neutralizing crystals, or medications.

In some embodiments, the pre-filter member comprises a micron filter.

The micron filter may include a cylindrical construction of pleated media.

In another aspect, a method of filtering aquarium water is provided. The method includes pumping water from an aquarium, through a transfer tube, and then expelling the water from the transfer tube through filter media held at the end of the transfer tube. The method also includes, after expelling the water through the filter media, filtering the water through a filter cartridge in a mechanical filter chamber.

In some methods, the step of expelling the water from the transfer tube through filter media held at the end of the transfer tube includes expelling the water from the transfer tube through filter media held by a rigid porous basket.

In some methods, the step of expelling the water from the transfer tube through filter media held at the end of the transfer tube includes expelling the water from the transfer tube through a cylindrical construction of micron filter media.

In some methods, after the step of filtering the water through a filter cartridge, there is a step of filtering the water through a biological filter downstream of the mechanical filter chamber.

Some methods further include a step of returning the filtered water to the aquarium.

The step of returning the filtered water to the aquarium is generally after the step of filtering the water through the biological filter.

A variety of examples of desirable product features or methods are set forth in the description that follows, and in part, will be apparent from the description, or may be learned by practicing various aspects of this disclosure. The aspects of this disclosure may relate to individual features, as well as combinations of features. It is to be understood that booth the foregoing general description, and the following detailed description, are explanatory only, and are not restrictive of the claimed inventions.

DETAILED DESCRIPTION

Figure 1:
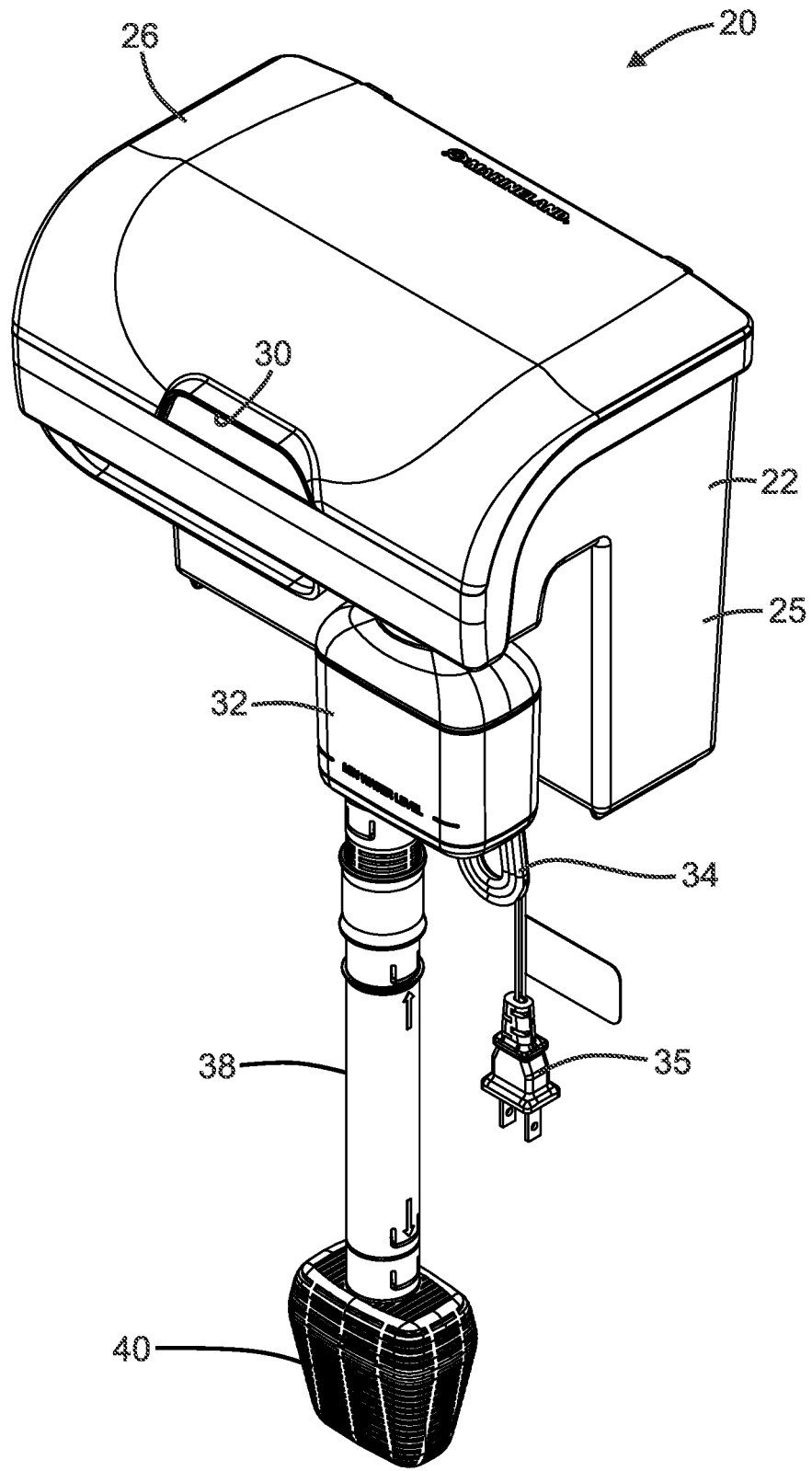
FIG. 1 is a perspective view of a first embodiment of a filter arrangement for an aquarium, constructed in accordance with principles of this disclosure.
Figure 2:
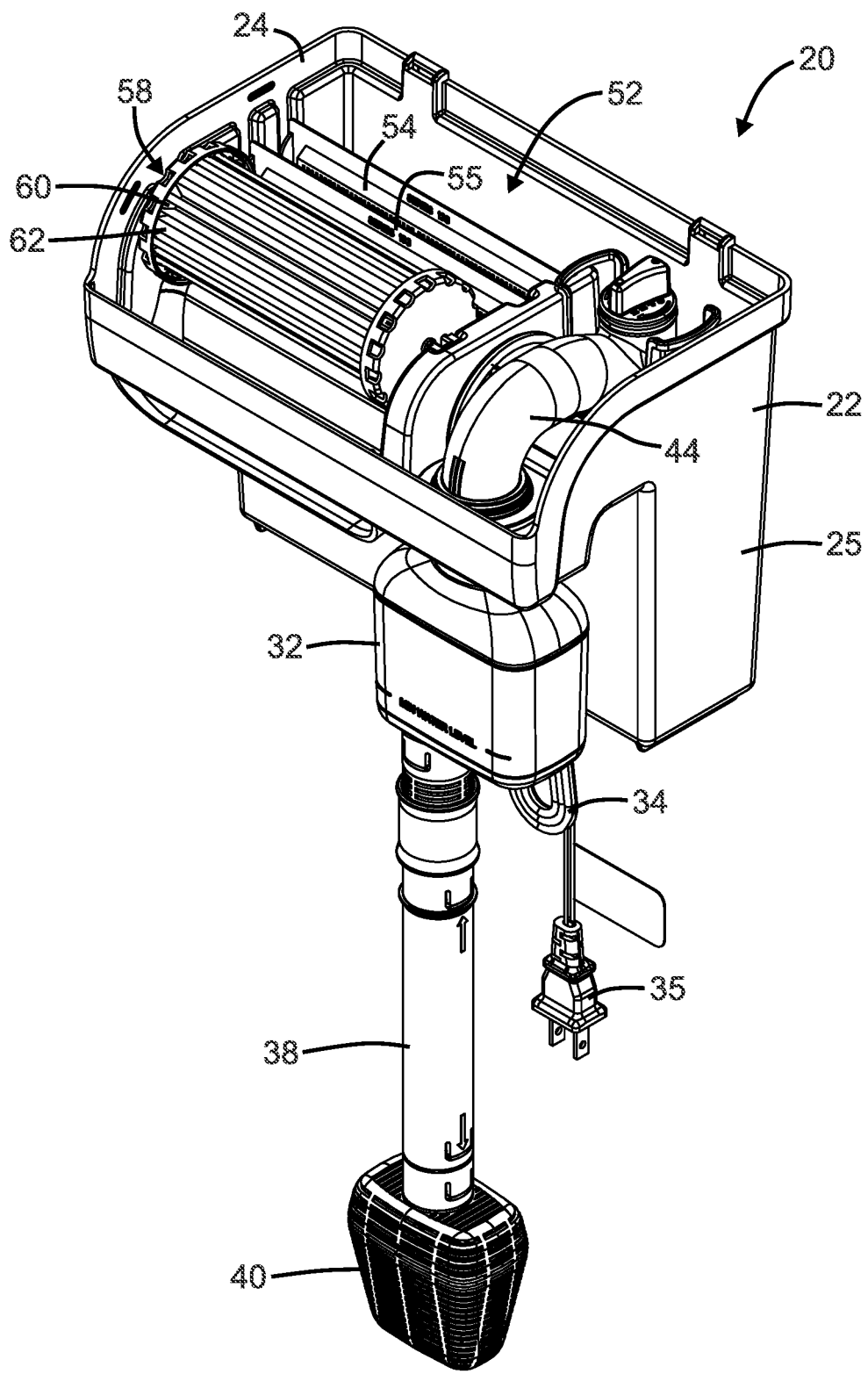
FIG. 2 is the filter arrangement of FIG. 1, with the cover removed to reveal internal components.

FIG. 1 illustrates a filter arrangement 20 for use in an aquarium. It should be understood that the filter arrangement 20 can be used for other aquatic applications, such as in pond applications, for example.

FIG. 1 illustrates the external components of the filter arrangement 20. The filter arrangement 20 includes a housing 22.

The housing 22 includes housing body 25 and a removable cover 26. In FIG. 1, the cover 26 is shown in the closed position, while in FIG. 3, the cover 26 is shown pivoted about a hinge point 28 away from the body 25 to an open or uncovered position. The open or uncovered position exposes the interior 24 and the internal components. In FIG. 1, it can be seen how the cover 26 has a handle 30 to accept a few fingers of a human hand to allow for a hand to grasp the cover 26 and then pivot the cover 26 from the closed position of FIG. 1 to the open position of FIG. 3.

Also visible in FIG. 1 is a pump 32. The pump 32 is powered by electricity. An electrical cord 34 with an outlet plug 35 is electrically connected to the pump 32 to allow for energizing the pump 32.

Also visible in FIG. 1 is an intake tube 38. The intake tube 38 includes a water inlet 40. The water inlet 40 and intake tube 38 extend into the aquarium tank. Operation of the pump 32 operates to draw in, or suck, water through the water inlet, through the intake tube, through the pump 32, and then into the interior 24 of the housing 22 for filtration.

Figure 3:
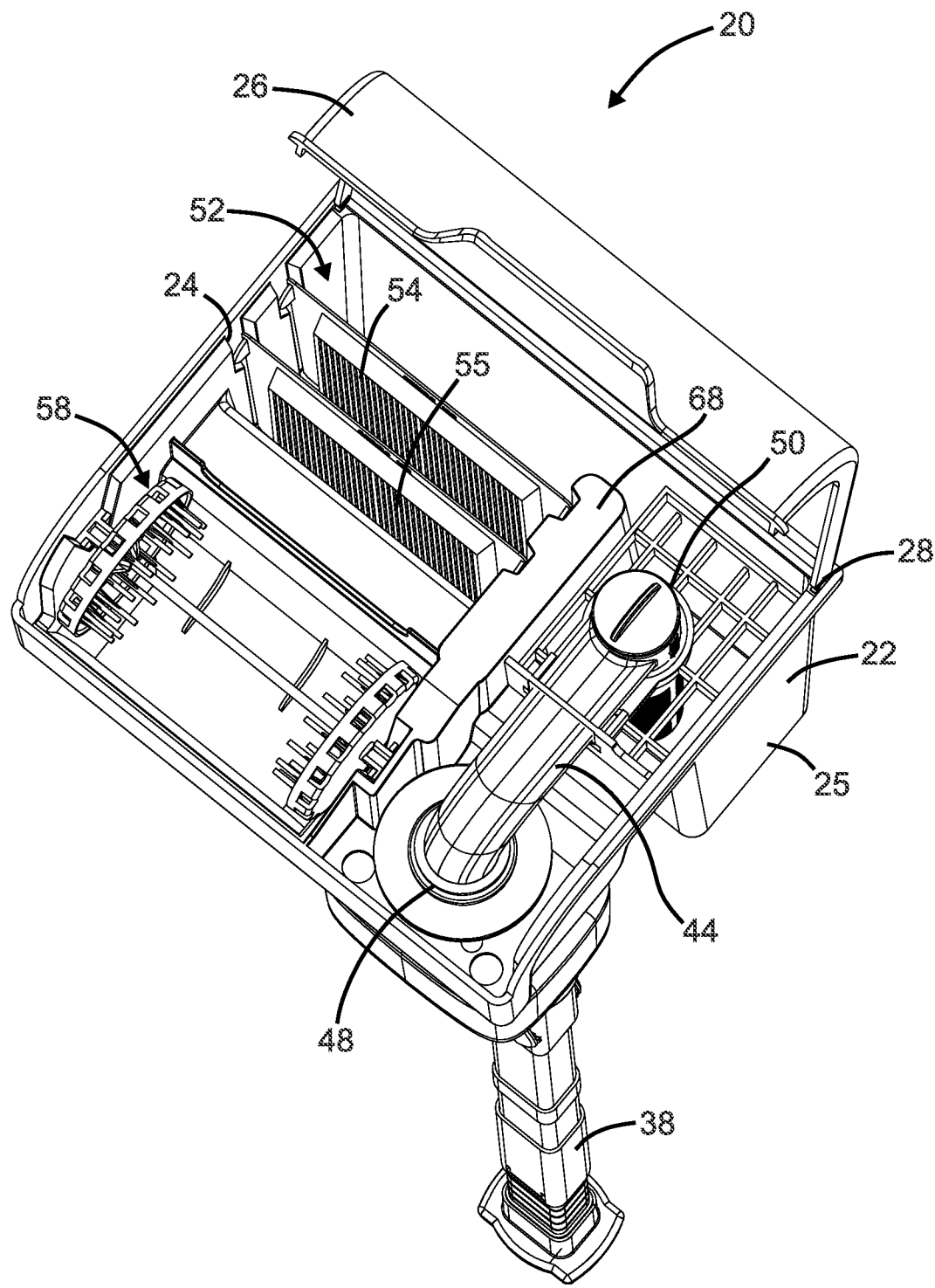
FIG. 3 is an upper perspective view of the filter arrangement of FIGS. 1 and 2, with the cover removed, to show internal components.
Figure 4:
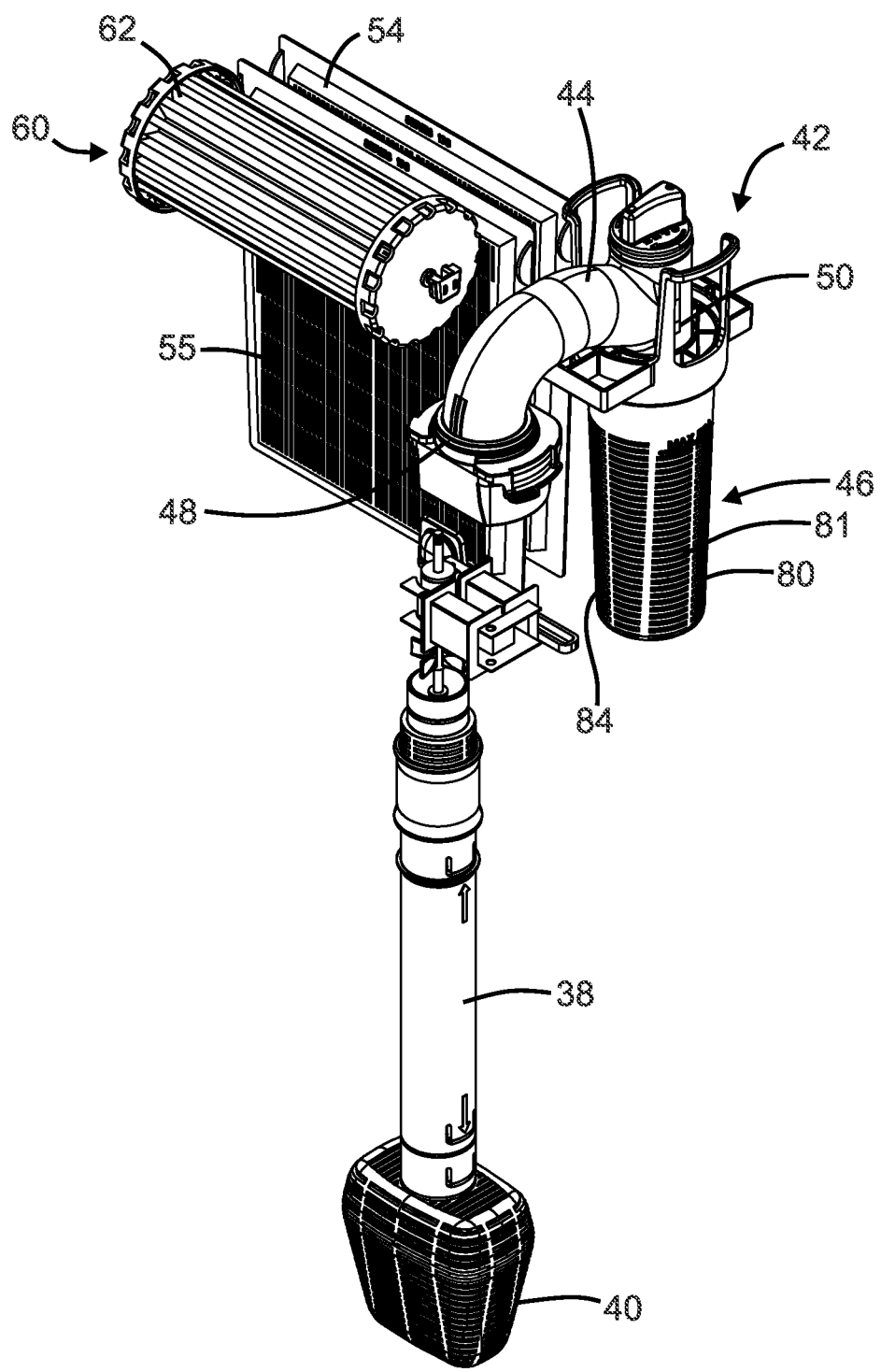
FIG. 4 is a perspective view of some of the internal components of the filter arrangement of FIGS. 1-3.

Reference is now made to FIGS. 3-7, which show internal components of the filter arrangement 20. In FIG. 4, a filter assembly is shown at 42. The filter assembly 42 includes a transfer tube 44 and a pre-filter member 46. The transfer tube 44 is located within the interior 24 of the housing 22. The transfer tube 44 is downstream of the pump 32 and has a pump end 48 adjacent to the pump 32 and an opposite distal end 50. The transfer tube 44 functions to transfer, or convey, aquarium water that has been pumped through the intake tube 38, through the pump 32, and then is transferred into the housing 22 for filtration.

The pre-filter member 46 is secured to the distal end 50 of the transfer tube 44. The pre-filter member 46 operates to provide a pre-cleaning of the aquarium water, before the water is conveyed to downstream filtration components. The pre-filter member 46 contains filter media 81, as embodied in different forms, depending upon the application. More details on the pre-filter member 46 are described below.

Downstream of the pre-filter member 46 is a mechanical filtering chamber 52 (FIG. 3). In the example embodiment shown, the mechanical filtering chamber 52 includes at least one, and in the embodiment shown, two removable and replaceable filter cartridges 54, 55. The filter cartridges 54, 55 can be made from a variety of materials and multiple layers. For example, a first layer can be a form of mechanical filtration using, for example, a floss, to screen out dirt and debris. A next layer can be media such as activated carbon, to remove odors, discoloration, and impurities. Many embodiments and many different filter media are possible.

Downstream of the mechanical filtering chamber 52 is a bio-filtering chamber 58. The bio-filtering chamber 58 is within the interior 24 of the housing 22 and holds a biological filter 60. While many embodiments are possible, in the example shown, the bio-filter 60 is a cylindrical wheel 62 (FIG. 4). The cylindrical wheel 62 rotates, as water from the mechanical filtering chamber 52 flows from it and returns the water to the aquarium. The biological filter 60 includes media fabric that cultures bacteria that oxidizes harmful ammonia and nitrite toxins.

Figure 7:
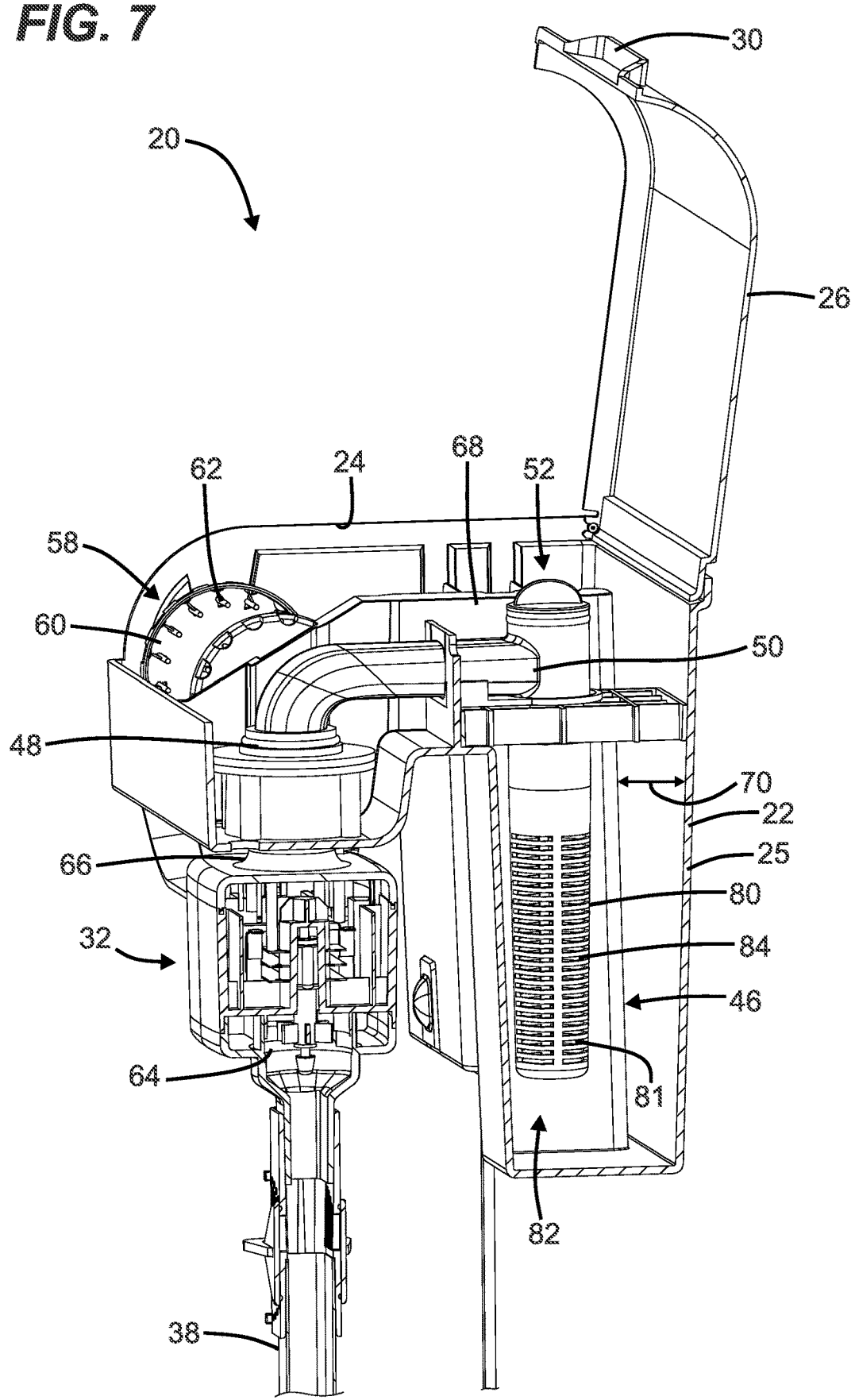
FIG. 7 is a perspective, cross-sectional view of the filter arrangement of FIGS. 1-6.

In FIG. 7, further details about the pump 32 are illustrated. The pump 32 has a liquid flow inlet 64 and a liquid flow outlet 66 at an opposite end. In general, water to be filtered is taken in from the aquarium through the water inlet 40, conveyed through the intake tube 38, flows into the liquid flow inlet 64 of the pump 32 and then flows through the liquid flow outlet 66 of the pump 32. The liquid flow outlet 66 is in flow communication with the pump end 48 of the transfer tube 44. The liquid flows through the transfer tube 44 and then into the pre-filter member 46. From there, the liquid flows into the mechanical filtering chamber 52, through the filter cartridges 54, 55, and into the bio-filtering chamber 58. From there, the liquid is filtered by the biological filter 60 and is then returned to the aquarium.

Figure 5:
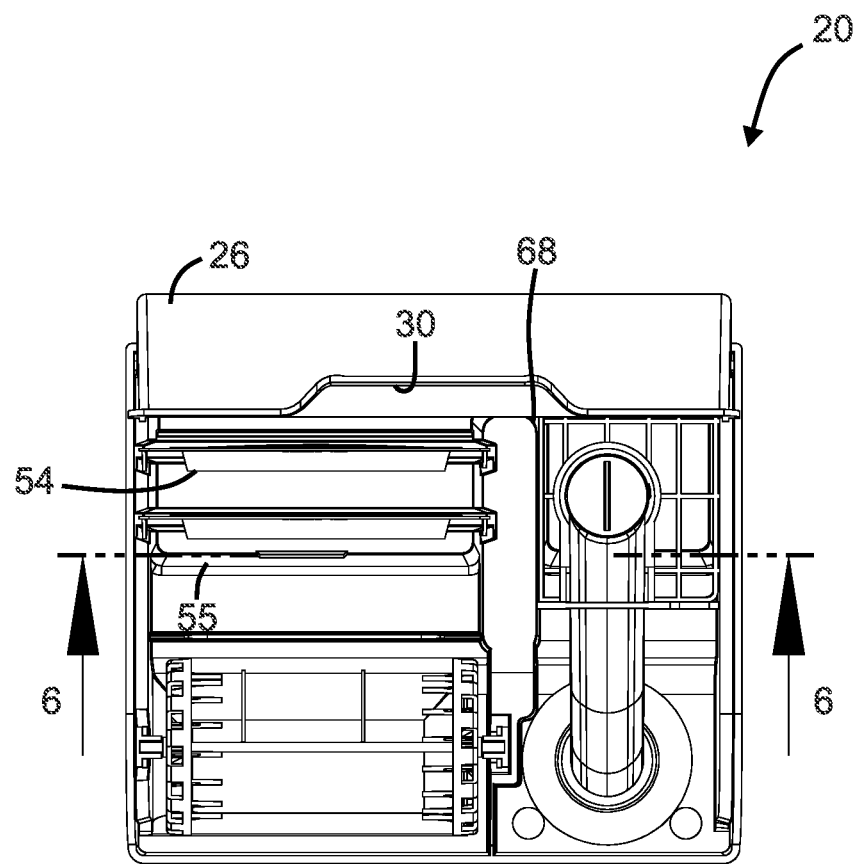
FIG. 5 is a top plan view of the filter arrangement of FIG. 1, with the cover removed to reveal internal components.
Figure 6:
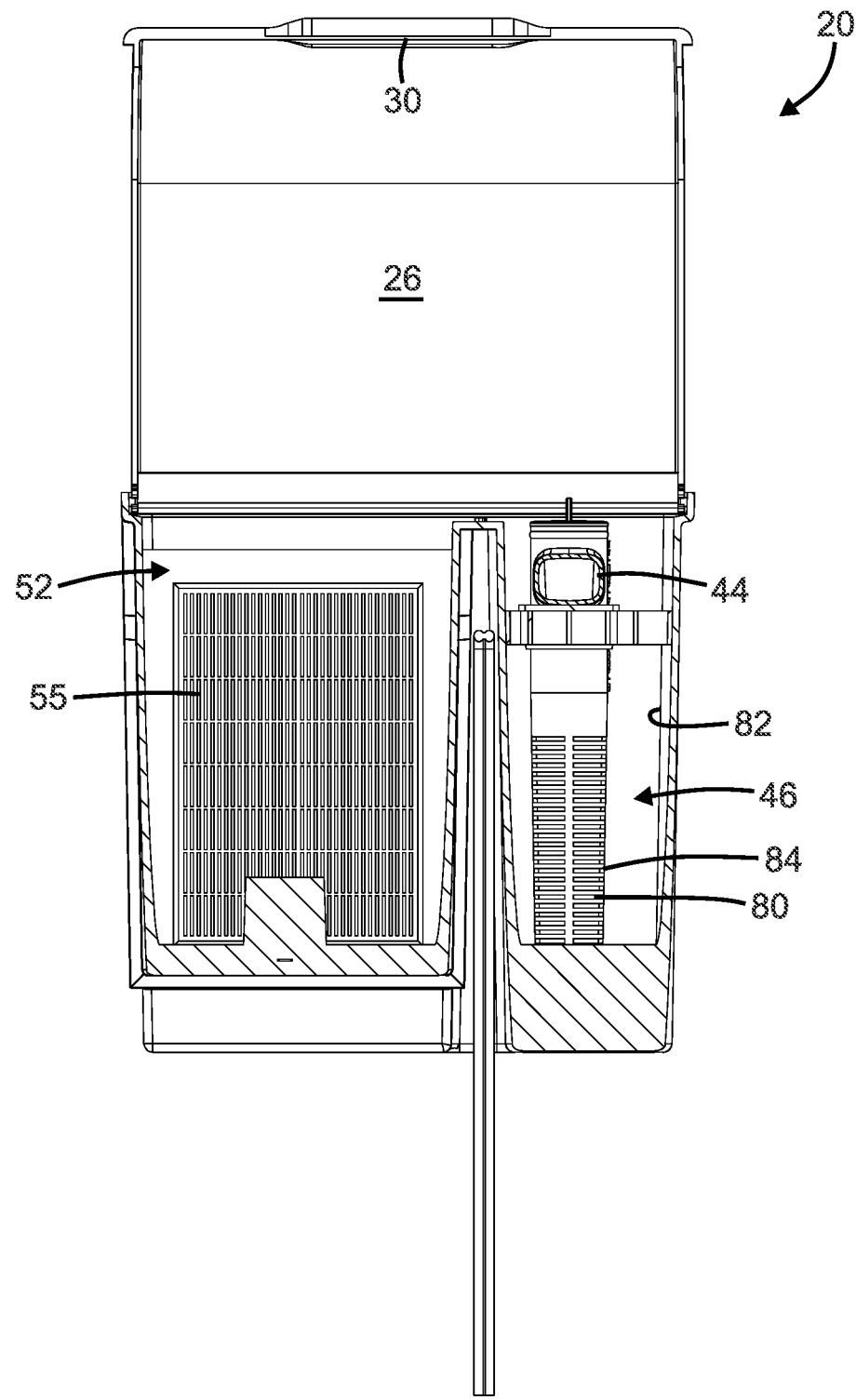
FIG. 6 is a cross-sectional view of the filter arrangement of FIG. 1, the cross section being taken along the line 6-6 of FIG. 5.

In FIGS. 3, 5, and 7, it can be seen how there is an internal wall 68 that separates the interior 24 of the housing 22 from the region of the housing 22 that houses the transfer tube 44 and the pre-filter member 46. In FIG. 7, a gap 70 between the wall of the housing body 25 and an end of the wall 68 is an open volume that allows the liquid to flow from the pre-filter member 46 into the mechanical filter chamber 52.

Example embodiments of the pre-filter member 46 are now further discussed. In the embodiment of FIGS. 3-8, the pre-filter member 46 comprises a media basket 80. The media basket 80 holds filter media 81 therewithin. Water from the transfer tube 44 is pushed through the filter media 81 within the basket 80 to make contact with the filter media 81. The water in the chamber 82 (FIGS. 6 and 7) that surrounds the media basket 80 will be turbulent, which will increase the water contact with the media 81 within the basket 80.

Figure 8:
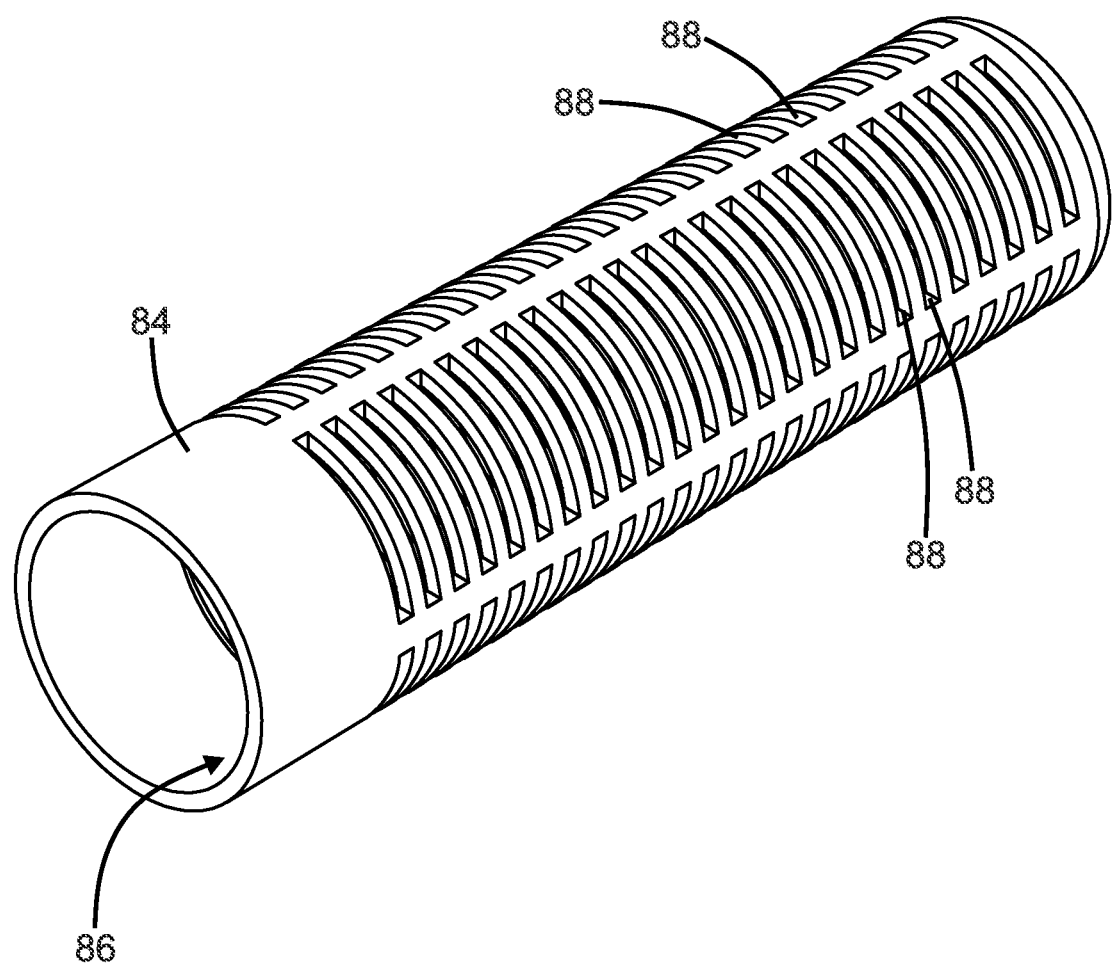
FIG. 8 is a perspective view of a pre-filter member embodied as a media basket, used in the embodiment of FIGS. 1-7.

The media basket 80 can take many different forms. In the one shown in the drawings, the media basket 80 has a rigid porous surrounding wall 84 defining an interior volume 86 (FIG. 8) therewithin. The filter media 81 is contained within the interior volume 86. As can be seen in FIG. 8, the wall 84 includes a plurality of openings 88, which can be any shape, and in the example shown in FIG. 8, are elongated slots. The openings 88 allow for the outflow of water from the interior 86 and into the chamber 82 before flowing into the mechanical filter chamber 52.

The basket 80 can have many different shapes. In the example shown in FIG. 8, the surrounding wall 84 of the basket 80 has a circular cross section. In other embodiments, the wall 84 can have a rectangular cross section.

The filter media 81 held by the basket 80 can be many different types. In one embodiment, the filter media 81 can be carbon media. In other embodiments, the media 81 can be one or a combination of foam; bio-balls; ceramic media; ammonia neutralizing crystals; or various medications. Bio-balls include generally spherical shaped plastic balls that encourage the growth of helpful bacteria.

The filter media 81 is removable and replaceable within the basket 80. Alternatively, the entire basket 80 containing the media 81 can be removed and replaced with a new basket 80 and media 81, when the media 81 is spent.

Figure 9:
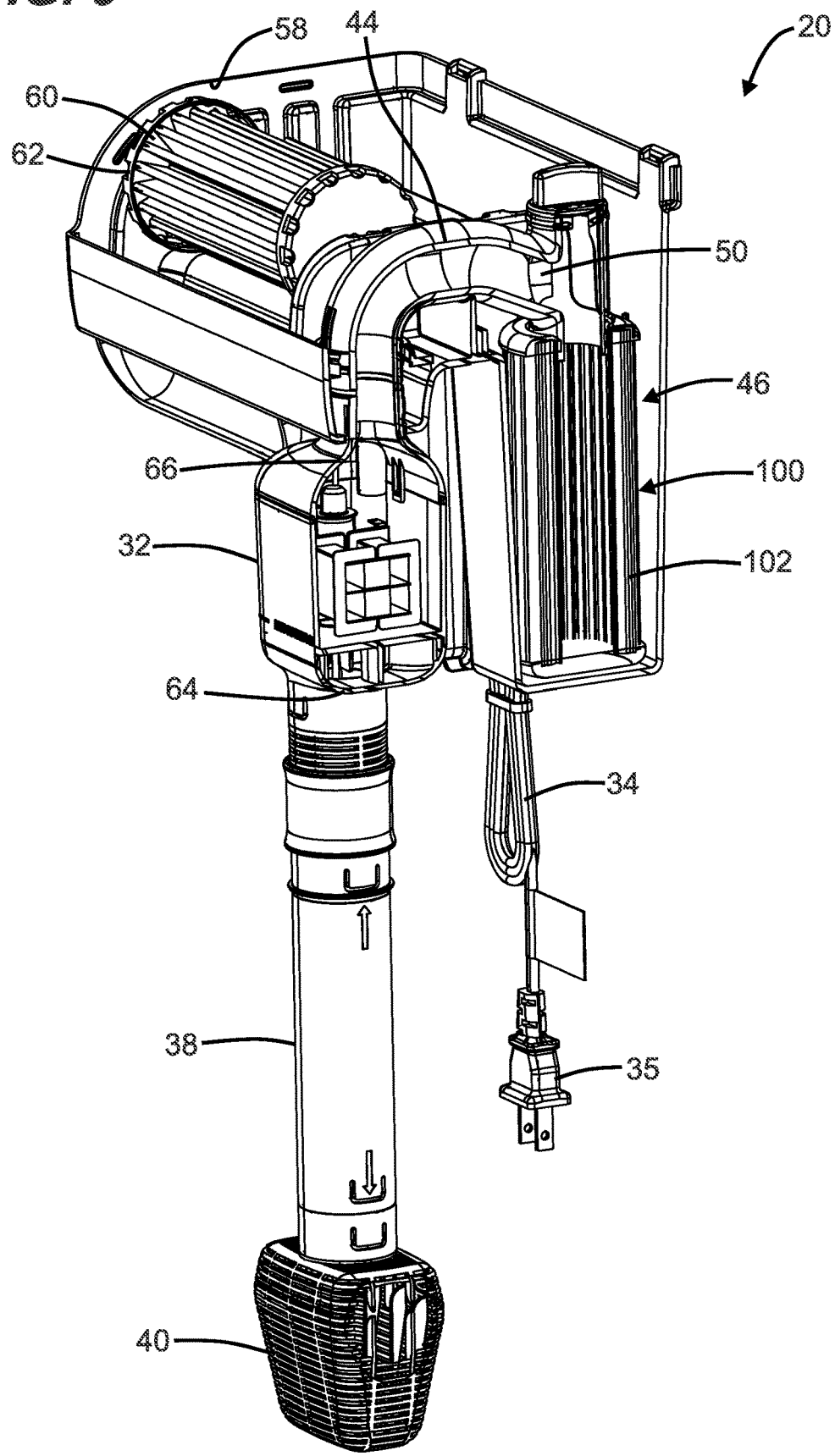
FIG. 9 is a perspective, cross-sectional view of another embodiment of a filter arrangement for use with an aquarium, constructed in accordance with principles of this disclosure.
Figure 10:
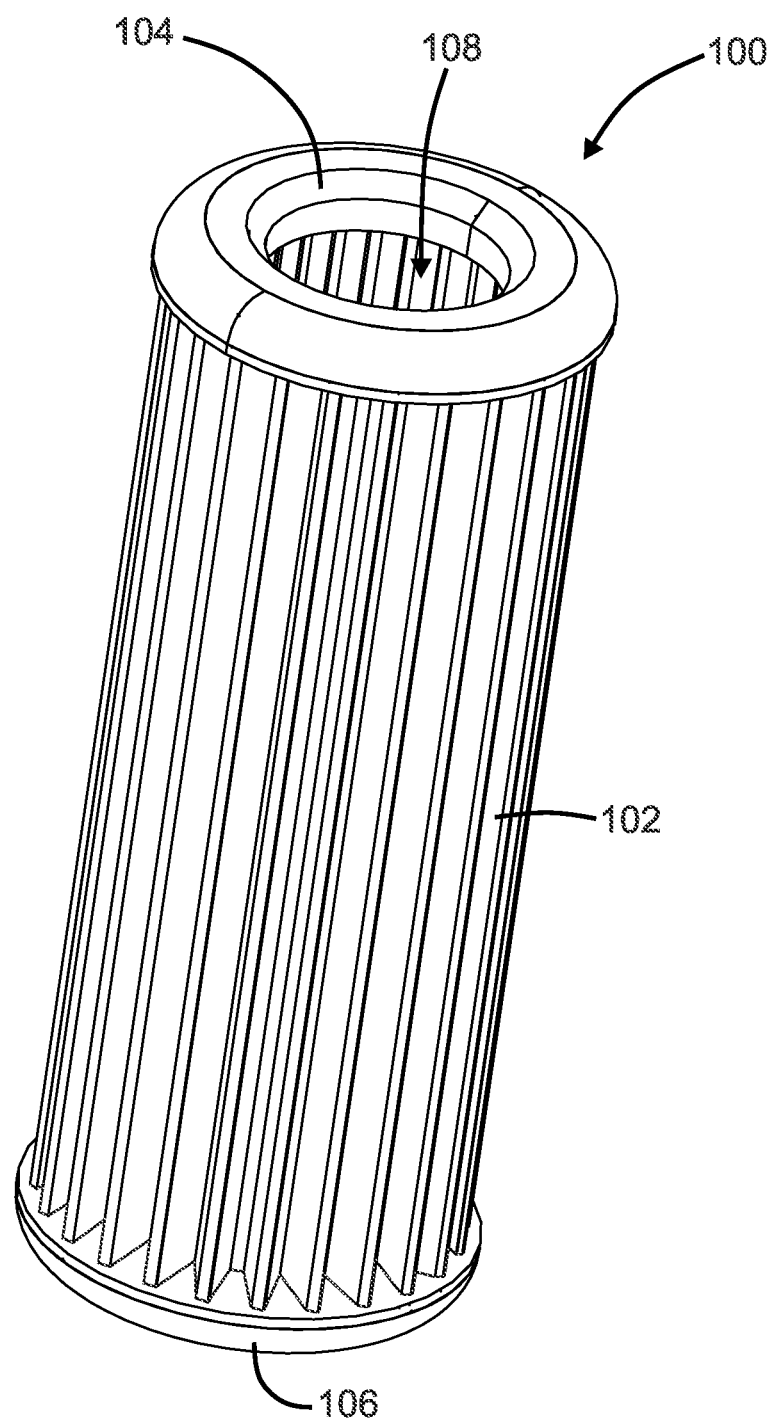
FIG. 10 is a perspective view of a pre-filter member used in the embodiment of FIG. 9, shown as a micron filter having pleated filter media.

Now in reference to the embodiment of FIG. 9, the pre-filter member 46, in this embodiment, comprises a micron filter 100. The micron filter 100 operates as a polishing filter to remove micron particulates from the water, before the water is conveyed to the downstream filtering components.

The micron filter 100 is in the form of a cylindrical construction of pleated media 102. The filter 100 has an open, inlet end 104 and an opposite closed end 106. The pleated media 102 extends between the inlet end 104 and the closed end 106.

The filter 100 connects directly to the distal end 50 of the transfer tube 44. The water flows from the transfer tube 44 into the inlet end 104 and into an interior volume 108 of the filter 100. From there, the water flows through the filter media 102 and then flows into the mechanical filtering chamber 52 for further filtration by the filter cartridges 54, 55 and the bio-filter 60, before returning to the aquarium.

The filter 100 can be cleaned periodically, and it can be removed and replaced with a new filter 100 after a period of use.

The filter arrangement 20 can be used as part of a method of filtering aquarium water. The method includes pumping water from an aquarium, through a transfer tube, and then expelling the water from the transfer tube through filter media held at the end of the transfer tube. In the example shown, water can be pumped using the pump 32, through transfer tube 44, and then expelled from the transfer tube 44 through filter media 81 held at the end of the transfer tube 44. The method also includes, after expelling the water through the filter media 81, filtering the water through a filter cartridge in a mechanical filter chamber. This can include filtering the water through one or more filter cartridges 54, 55 located in mechanical filter chamber 52.

The step of expelling the water from the transfer tube 44 through filter media 81 held at the end of the transfer tube 44 can include expelling the water from the transfer tube 44 through filter media 81 held by a rigid porous basket, such as basket 80.

The step of expelling the water from the transfer tube 44 through filter media held at the end the transfer tube 44 can include expelling the water from the transfer tube 44 through a cylindrical construction of micron filter media, such as the pleated media 102 of the micron filter 100.

The method can further include, after the step of filtering the water through filter cartridge 54, 55, filtering the water through a biological filter downstream of the mechanical filter chamber 52. This can include filtering the water through bio-filter 60.

The method can further include a step of returning the filtered water to the aquarium. This can be done after the step of filtering the water through the biological filter 60.

The above represents example principles. Many embodiments can be made using these principles.

What is claimed is:

1. An aquarium filter assembly comprising:
   (a) a housing including a top, a bottom, and an outer sidewall extending generally vertical therebetween and having an interior;
   (b) a transfer tube within the housing interior to convey aquarium liquid having a distal end;
   (c) a pre-filter member within the housing interior secured to the distal end of the transfer tube; the distal end being vertically above the pre-filter member;
      (i) the pre-filter member containing filter media and allowing filtering flow from inside of the pre-filter member to outside of the pre-filter member and into a pre-filter chamber;
      (ii) the pre-filter chamber being positioned to surround the pre-filter member to result in liquid within the pre-filter chamber to be turbulent, causing contact with the filter media within the pre-filter member;
   (d) a mechanical filter chamber downstream of the pre-filter member; and
   (e) an internal wall within the housing interior separating the transfer tube and pre-filter member from the mechanical filter chamber;
      (i) a gap being between the outer sidewall of the housing and the internal wall and being an open volume to allow liquid to flow from the pre-filter chamber into the mechanical filter chamber.

2. The filter assembly of claim 1 wherein:
   (a) the pre-filter member comprises a media basket including a rigid porous surrounding wall defining an interior volume holding the filter media within the interior volume; and
   (b) the rigid porous surrounding wall includes a plurality of openings extending a substantial length of the surrounding wall.

3. The filter assembly of claim 2 wherein the rigid porous surrounding wall has a circular cross-section.

4. The filter assembly of claim 2 wherein the rigid porous surrounding wall has a rectangular cross-section.

5. The filter assembly of claim 2 wherein the filter media held by the porous basket comprises carbon media.

6. The filter assembly of claim 2 wherein the filter media held by the porous basket includes one or a combination of: foam, bio-balls, ceramic media; ammonia neutralizing crystals; or medications.

7. The filter assembly of claim 1 wherein the pre-filter member comprises a micron filter.

8. The filter assembly of claim 7 wherein the micron filter includes a cylindrical construction of pleated media.

9. The filter assembly of claim 1 further comprising a pump having a liquid flow inlet and liquid flow outlet; the transfer tube being in flow communication with the liquid flow outlet of the pump.

10. The filter assembly of claim 9 further comprising an intake tube upstream of and in flow communication with the liquid flow inlet of the pump.

11. The filter assembly of claim 1 further comprising a mechanical filter cartridge downstream of the pre-filter member.

12. The filter assembly of claim 11 further comprising a biological filter downstream of the mechanical filter cartridge.

13. A method of filtering aquarium water using the aquarium filter assembly of claim 1; the method comprising:
  (a) pumping water from an aquarium, through the transfer tube, and then expelling the water from the transfer tube through the filter media; and
  (b) after expelling the water through the filter media, filtering the water through a filter cartridge in the mechanical filter chamber.

* * * * *